(12) United States Patent
Marand et al.

(10) Patent No.: US 12,055,216 B2
(45) Date of Patent: Aug. 6, 2024

(54) MANUAL TRANSMISSION LOCK FOR PARKING ASSISTANCE

(71) Applicant: KTM AG, Mattighofen (AT)

(72) Inventors: Sascha Marand, Mondsee (AT); Thomas Koinegg, Fusch (AT)

(73) Assignee: KTM AG, Mattighofen (AT)

( * ) Notice: Subject to any disclaimer, the term of this patent is extended or adjusted under 35 U.S.C. 154(b) by 0 days.

(21) Appl. No.: 17/879,183

(22) Filed: Aug. 2, 2022

(65) Prior Publication Data
US 2023/0043711 A1 Feb. 9, 2023

(30) Foreign Application Priority Data

Aug. 5, 2021 (AT) .............................. A 50642/2021

(51) Int. Cl.
| | |
|---|---|
| *F16H 63/34* | (2006.01) |
| *F16H 63/18* | (2006.01) |
| *B62M 11/06* | (2006.01) |
| *B62M 25/08* | (2006.01) |
| *F16H 63/42* | (2006.01) |

(52) U.S. Cl.
CPC ......... *F16H 63/3425* (2013.01); *F16H 63/18* (2013.01); *F16H 63/3416* (2013.01); *F16H 63/3433* (2013.01); *F16H 63/3458* (2013.01); *B62M 11/06* (2013.01); *B62M 25/08* (2013.01); *F16H 63/42* (2013.01)

(58) Field of Classification Search
CPC .................. B62M 11/06; B62M 25/08; F16H 2057/02065; F16H 63/0006; F16H 63/18; F16H 63/3425; F16H 63/3433; F16H 63/3458; F16H 63/3466; F16H 63/34; F16H 63/3416
See application file for complete search history.

(56) References Cited

U.S. PATENT DOCUMENTS

| | | | |
|---|---|---|---|
| 6,725,962 | B1 | 4/2004 | Fukuda |
| 7,753,187 | B2 | 7/2010 | Fujimoto et al. |

(Continued)

FOREIGN PATENT DOCUMENTS

| | | |
|---|---|---|
| CN | 104896085 | 9/2015 |
| DE | 10 2008 014 271 | 9/2009 |

(Continued)

*Primary Examiner* — Joseph Brown
(74) *Attorney, Agent, or Firm* — Wenderoth, Lind & Ponack, L.L.P.

(57) ABSTRACT

A gearshift lock for a gearbox includes a gearshift cylinder and a pawl wheel with a toothing. The gearshift lock includes a rotatably positioned pawl, and the pawl engages in the toothing of the pawl wheel in a locked position, and is disengaged from the pawl wheel in a freewheeling position. The pawl is pretensioned by a spring element in the direction of the locked position, and an engagement element is connected to the pawl. The engagement element holds the pawl in the freewheeling position by directly interacting with the gearshift cylinder against the effect of the spring element when the gearshift cylinder takes up a rotational position in a freewheeling rotational range, and the pawl can be released from the gearshift cylinder into a locked position by the engagement element when the gearshift cylinder takes up a rotational position in a locked rotational range.

20 Claims, 4 Drawing Sheets

(56) References Cited

U.S. PATENT DOCUMENTS

| | | |
|---|---|---|
| 8,926,467 B2 | 1/2015 | Grant |
| 9,242,623 B2 | 1/2016 | Burgardt et al. |
| 9,272,690 B2 | 3/2016 | Burgardt |
| 9,440,625 B2 | 9/2016 | Märklen |
| 9,518,657 B2 | 12/2016 | Kristofesak |
| 9,657,836 B2* | 5/2017 | Kristofcsak ......... F16H 63/3416 |
| 2007/0158161 A1* | 7/2007 | Fujimoto ............ F16H 63/3416 |
| | | 192/219.4 |
| 2013/0256089 A1 | 10/2013 | Burgardt et al. |
| 2014/0060994 A1 | 3/2014 | Burgardt |
| 2014/0256503 A1* | 9/2014 | Grant ...................... F16H 3/091 |
| | | 475/343 |
| 2015/0027846 A1 | 1/2015 | Märklen |
| 2015/0252897 A1 | 9/2015 | Kristofcsak |
| 2018/0328487 A1* | 11/2018 | Nishimoto .......... F16H 63/3416 |

FOREIGN PATENT DOCUMENTS

| | | |
|---|---|---|
| DE | 10 2012 007 061 | 10/2013 |
| DE | 10 2013 107 860 | 1/2015 |
| DE | 10 2015 224 285 | 6/2017 |
| DE | 10 2019 130 830 | 5/2021 |
| DE | 102019130829 | 5/2021 |
| EP | 1 865 237 | 12/2007 |
| EP | 2 275 719 | 1/2011 |
| JP | 11-303991 | 11/1999 |
| JP | 2007-187198 | 7/2007 |
| JP | 2012-197812 | 10/2012 |

\* cited by examiner

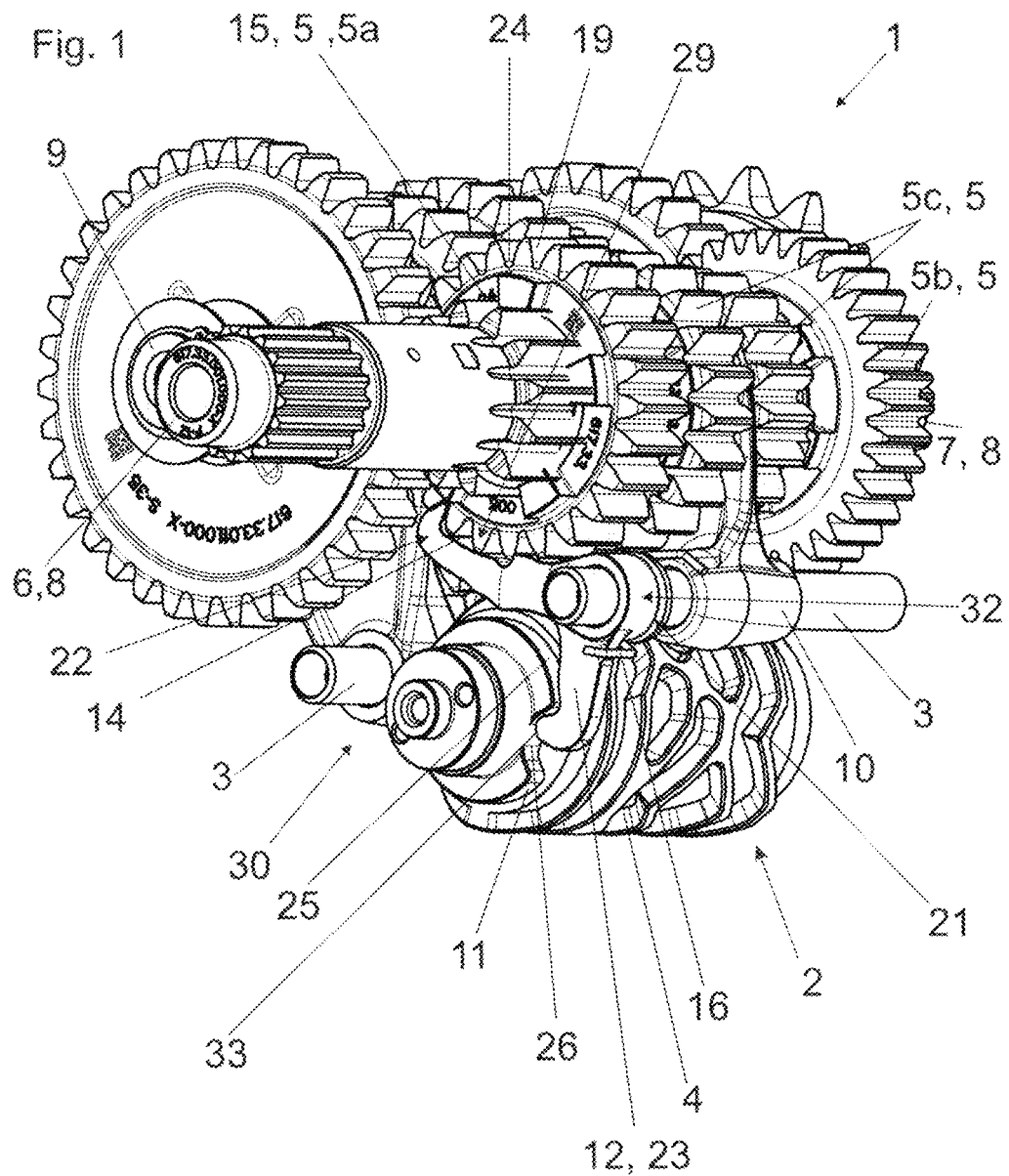

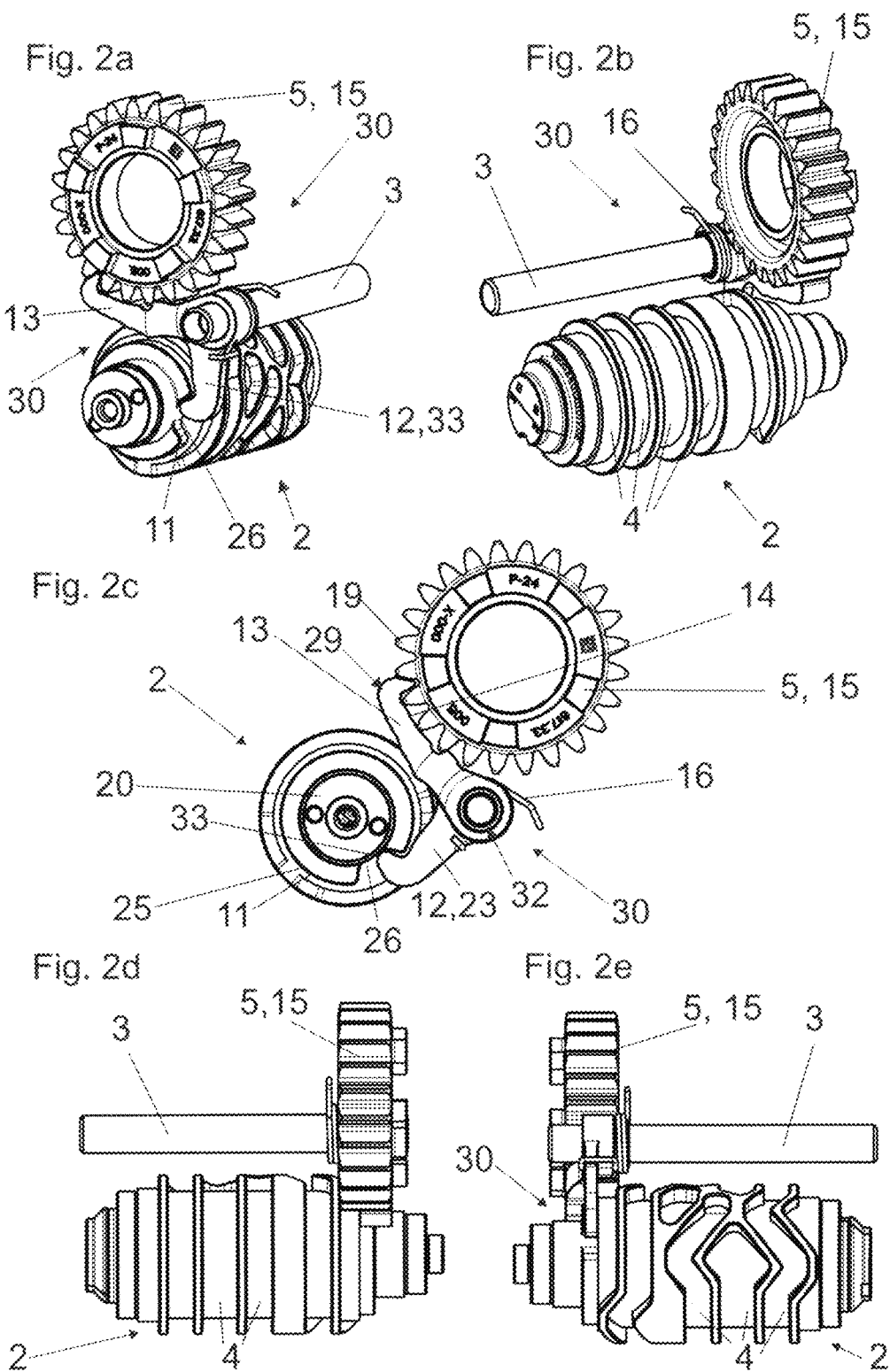

MANUAL TRANSMISSION LOCK FOR PARKING ASSISTANCE

BACKGROUND OF THE INVENTION

The invention concerns a gearshift lock for parking assistance, for a gearbox comprising at least one gearshift cylinder and at least one pawl wheel with a toothing, wherein the gearshift lock comprises a rotatably positioned pawl, wherein the pawl engages in the toothing of the at least one pawl wheel in a locked position, and is disengaged from the at least one pawl wheel in a released position, and wherein the pawl is pretensioned by a spring element in the direction of the locked position.

In addition, the invention concerns a gearbox comprising at least one gearshift cylinder, at least one pawl wheel with a toothing, and a gearshift lock. The invention also comprises a motorcycle having a drive motor and a gearbox.

When parking motorcycles on sloping terrain or during transport, the motorcycles must be secured against rolling. Motorcycles with a manual gearbox usually have a gear engaged for this purpose so that the wheels are coupled to the drive motor.

In automatic gearboxes in particular, the drive motor is often coupled to the gearbox by a "normally open" clutch, especially a centrifugal clutch. At standstill, the "normally open" clutch runs idle, which means that there is no connection between the drive motor and the gearbox. Engaging a gear therefore does not result in the desired blocking of the wheels. A parking brake is therefore necessary, especially on motorcycles with automatic gearbox.

A parking brake on motorcycles can be realized with its own rear wheel and/or front wheel brake. This can, for instance, be actuated from the handlebar via a separate lever or via the side stand. The disadvantage hereby is that a separate brake system must be created for the parking brake, and thus a plurality of additional components must be installed. In addition, an actuation indication must be monitored with an additional sensor. When actuated via a separate lever on the handlebar, releasing the parking brake can be forgotten.

It is also provided in the prior art that the front wheel brake and/or the rear wheel brake are permanently applied when parking. This means that only the existing service brake system is used. The disadvantage hereby is that this can impair the function of the service brake system. In addition, an actuation indication must be monitored with an additional sensor. In particular, it is possible to forget to release a permanent actuation of the rear brake when driving off.

In the prior art, parking brakes, which are formed as gearshift locks, are still provided for motor vehicles such as cars or quads.

EP 1 865 237 A1 shows a gearshift lock for a quad, where a pawl wheel in the gearbox can be blocked by a pawl. The pawl is rotatably mounted and fixed to a support arm. The support arm is pretensioned against a gearshift cylinder of the gearbox in a freewheeling position of the pawl wheel. A locking cam is attached to the gearshift cylinder, whereby the lever on the pawl can be pressed into the pawl wheel against the preload by rotating the gearshift cylinder into a rotational position determined by the position of the locking cam, and thus realizing a locked position.

A disadvantage of this prior art is that the pawl is pressed into the locked position by a locking cam. It must therefore be avoided that a pawl tooth hits on a tooth of the pawl wheel. As a solution, EP 1 865 237 A1 continues providing an additional spring, which compresses when a pawl tooth hits a tooth of the pawl wheel, and thus prevents damage to the pawl or the pawl wheel. This necessitates a plurality of components.

DE 10 2013 107 860 A1 shows a gearshift lock for an automatic gearbox, in which a pawl wheel in the gearbox can be locked by a pawl. The pawl is hereby actuated by a cam disc via a lever mechanism with several levers rotatably connected to each other. The cam disk can be arranged on a gearshift cylinder of the gearbox, allowing the pawl to also be actuated via a rotation of the gearshift cylinder. By means of the lever mechanism, the pawl wheel can be arranged far away from the cam disc, making the gearshift lock suitable for large automatic gearboxes. The pawl can be at least temporarily pretensioned in the direction of a closed position.

A disadvantage of this prior art is that the lever mechanism takes up a lot of space, and is therefore not suitable for motorcycles in particular. Also, a plurality of components is necessary for this.

SUMMARY OF THE INVENTION

An object of the present invention is to provide a gearshift lock, a gearbox having a gearshift lock, and a motorcycle having a gearshift lock, whereby the gearshift lock is formed compactly and comprises few components.

With a gearshift lock according to the invention, an engagement element is connected with the pawl, and the engagement element holds the pawl in the freewheeling position by directly interacting with the gearshift cylinder against the effect of the spring element, when the gearshift cylinder takes up a rotational position in a freewheeling rotational range, and wherein the pawl can be released from the gearshift cylinder into a locked position by means of the engagement element when the gearshift cylinder takes up a rotational position in a locked rotational range.

The connection between the engagement element and the pawl is a torque-proof connection. In particular, it is a rigid, non-displaceable connection. The engagement element and the pawl can be formed as one component or as several components.

By having an engagement element connected to the pawl, wherein the engagement element holds the pawl in the freewheeling position by directly interacting with the gearshift cylinder against the effect of the spring element, no lever mechanism with several levers connected to each other rotatably and/or non-displaceably is necessary to actuate the pawl. This enables a compact design and a reduction of components.

The fact that the engagement element interacts directly with the gearshift cylinder in order to hold the pawl in the freewheeling position against the effect of the spring element means that the actuating mechanism is free of a leverage effect between the gearshift cylinder and engagement element. However, a roller for unrolling on the gearshift cylinder can optionally be provided on the engagement element, for instance, since no leverage effect between the gearshift cylinder and the engagement element is caused by this. In particular, the engagement element can be formed in several parts.

It can also mean that the gearshift cylinder engages with a component, such as for instance a driver pin, which is connected to the pawl in a fixed, in particular non-displaceable and/or rotatably movable manner. It can also mean that the gearshift cylinder engages with the pawl by means of a component, such as for instance a fixedly attached actuating baffle guide, which is connected to the gearshift cylinder in a fixed, in particular non-displaceable and/or rotatably movable, manner.

At the same time, according to the invention, the pawl is preloaded by a spring element in the direction of the locked position. Thus, the pawl is pressed against the pawl wheel by the spring element in the freewheeling position, and does not have to be pressed into the locked position, for instance by a locking cam. It therefore need not be avoided that a pawl tooth meets a tooth of the pawl wheel. As long as the pawl wheel keeps rotating, the pawl tooth will move into a space between the teeth of the pawl wheel when the opportunity arises.

In a preferable embodiment, the pawl has a bearing portion, and the pawl is rotatably positioned in the bearing portion, and a locking range, where the pawl engages the toothing of the pawl wheel in the locking range.

According to a further embodiment, the spring element is designed as a torsion spring and/or arranged in a bearing portion of the pawl. In this way, the desired preload of the pawl is achieved in a space-saving manner.

Additionally or alternatively, the spring element can engage in the pawl in a second end area of the pawl. In such a case, it can be provided that the spring element is rotatably positioned on the gearshift cylinder. In this way, the gearshift cylinder already present in the gearbox is additionally used as a bearing pin for the spring element. The spring element can comprise a compression spring and/or a telescopic guide.

With both embodiments of the spring element, the pawl is thus pretensioned in the direction of the locked position.

The pawl can have a pawl contour in a locking range, and the pawl contour engages in the toothing of the at least one pawl wheel. Thereby, the edge of the pawl can for instance form the pawl contour.

The pawl contour can engage in at least one interdental space, and thereby blocking the at least one pawl wheel. It can also be provided that the pawl contour engages in at least two interdental spaces. This means that the at least one pawl wheel does not have to be held by only one pawl tooth, and the load can be distributed.

In one embodiment, the pawl contour is adapted to the toothing of the at least one pawl wheel such that the pawl is mechanically repelled by the at least one pawl wheel, so that the gearbox does not block when the pawl engages in a rotating pawl wheel. The pawl contour can also be adapted in such a way that the pawl can be released from the locked position even when the gearbox is under load. For this purpose, the opening torque must be greater than the frictional force.

In a further embodiment, the freewheeling rotational range of the gearshift cylinder takes up an angle from 330 degrees to 350 degrees, and/or the locked rotational range of the gearshift cylinder takes up an angle from 10 degrees to 30 degrees. In the freewheeling rotational range, there is therefore sufficient space for shift contours for the usual shifting of the gears of the gearbox.

The engagement element is formed as a support arm. The support arm can hold the pawl in the freewheeling position by supporting it on the gearshift cylinder against the effect of the spring element when the gearshift cylinder takes up a rotational position in a freewheeling rotational range.

Thereby the support arm preferably comprises a contact surface for placing on the gearshift cylinder. The support arm can support itself on the gearshift cylinder with the contact surface. A roller for rolling on the gearshift cylinder can for instance also be attached to the contact surface.

Furthermore, the support arm is connected to the pawl in a bearing portion of the pawl. In particular, the support arm can be positioned, preferably together with the pawl, on a gearshift rail of the gearbox.

Preferably, the support arm, together with the pawl, forms a two-sided lever, in particular an angle lever, particularly preferable, wherein the angle of the angle lever is in the range from 80 to 100 degrees. By using it as an angle lever, a particularly compact design of the gearshift lock can be achieved, since this enables the at least one pawl wheel and the gearshift cylinder to be arranged closer to one another with the same leverage effect.

Further, a contact surface for placing the support arm on the gearshift cylinder, and a pawl contour for engagement of the pawl in the toothing of the at least one pawl wheel can be arranged on the same side of the support arm or pawl, respectively, as viewed from a shared bearing portion of the support arm and pawl. The gearshift cylinder or the at least one pawl wheel, respectively, is suitably arranged on this respective side of the support arm or the pawl. The pawl is thereby preferably arranged between the gearshift cylinder and the at least one pawl wheel.

The gearshift cylinder can have an actuating contour, wherein the engagement element can be supported on the actuating contour in the freewheeling position. This is particularly useful in cases when the engagement element is formed as a support arm. In this way, the engagement element can hold the pawl in the freewheeling position by directly interacting with the gearshift cylinder against the effect of the spring element. The shape of the actuating contour defines, at least in sections, the rotational position of the pawl depending on the rotational position of the gearshift cylinder.

Preferably, the actuating contour in the freewheeling rotational range of the gearshift cylinder runs along a circular path so that the engagement element rests with a contact surface on the actuating contour. This means that the position of the pawl not engaging in the pawl wheel does not change in the entire freewheeling rotational range. Alternatively, an elliptical or another non-circular shape of the actuating contour can be provided.

It can additionally be provided that a recess recessed radially inward-pointing and/or a curve recessed radially inward-pointing is provided in the locked rotational range of the gearshift cylinder, so that the engagement element is released in radial direction at a rotational position of the gearshift cylinder in the locked rotational range, and/or is arranged radially further inwards than at a rotational position of the gearshift cylinder in the freewheeling rotational range. If the engagement element, particularly when designed as a support arm, designs a two-sided lever, particularly an angle lever, together with the pawl, this results in a movement of the pawl towards the pawl wheel so that the pawl engages in the pawl wheel.

Alternatively, the engagement element is designed as a driver pin, wherein the driver pin interacts directly with the gearshift cylinder.

The driver pin can be fixed to the pawl between the bearing portion and at least part of the locking range. This means that no additional levers and/or lever mechanisms are necessary, and a very compact design of the gearshift lock can be realized with few components.

The gearshift cylinder can have an actuating baffle guide, and the engagement element of the pawl is designed as a driver pin, wherein the driver pin can be held or released by the actuating baffle guide. The shape of the actuating baffle guide defines, at least in sections, the rotational position of the pawl depending on the rotational position of the gearshift cylinder.

The actuating baffle guide can run along a circular path in the freewheeling rotational range of the gearshift cylinder so that the driver pin in the freewheeling rotational range can preferably be held in a position in radial direction of the gearshift cylinder. This means that the position of the pawl in the freewheeling rotational range, which does not engage with the pawl wheel, does not change. Alternatively, an elliptical or another non-circular shape of the actuating baffle guide can be provided.

The actuating baffle guide can have a radially outwardly pointing bulge and/or a radially outwardly pointing curve in the locked rotational range of the gearshift cylinder so that the engagement element, in particular the driver pin, is preferably released at a rotational position of the gearshift cylinder in the locked rotational range in radial direction. Then, the engagement element is arranged further outwards than when the gearshift cylinder is at a rotational position in the freewheeling rotational range. If the driver pin is attached to the pawl between the bearing portion and at least part of the locking range, this results in a movement towards the pawl wheel so that the pawl and the pawl wheel engage.

The driver pin can be held in a second radial position at a rotational position of the gearshift cylinder in the freewheeling rotational range in radial direction, wherein the second radial position is arranged further outwards than the radial position of the driver pin in the freewheeling rotational range.

In a preferred embodiment, the actuating contour and/or the actuating baffle guide is arranged radially within an outer radius of the gearshift cylinder. This means that the size of the gearshift cylinder is no larger than the one of a gearshift cylinder in a gearbox without a gearshift lock, allowing a compact design to be realized.

The actuating contour and/or the actuating baffle guide can be arranged on one front face of the gearshift cylinder. This means that no additional component, such as a cam wheel for instance, is required on the gearshift cylinder, thus keeping the number of components low.

In a particularly preferred embodiment, the pawl and/or at least one locking range of the pawl is arranged in a space between the gearshift cylinder and the at least one pawl wheel. As a result, a particularly compact design is realized.

A gearbox according to the invention comprises at least one gearshift cylinder, at least one pawl wheel with a toothing, and a gearshift lock described in the disclosure of the present document.

Thereby, the gearbox preferably has a housing, and the gearshift lock is arranged entirely in the housing. The compact design of the gearshift lock makes this possible even with small gearboxes. Due to the positioning in the engine interior, the system is weather-protected and maintenance-free.

In one embodiment, the at least one pawl wheel is connected in a torque-proof manner to an output shaft of the gearbox. Thereby, the at least one pawl wheel can be provided exclusively for locking the gearbox.

In a particularly preferred embodiment, the gearbox has a number of gearwheels, wherein the at least one pawl wheel is designed as at least one lockable gearwheel of the number of gearwheels. This means that no additional gearwheel is required to lock the gearbox, thus saving weight and components.

A gearwheel transmits power from the input shaft of the gearbox to the output shaft of the gearbox in at least one shift position of the gearbox.

It can thereby be provided that at least one lockable gearwheel is designed as a fixed wheel of the gearbox. Here, a gearwheel is referred to as a fixed wheel, which is attached to a shaft in a torque-proof and non-displaceable manner.

Alternatively, the at least one lockable gearwheel is designed as a control wheel of the gearbox. A gearwheel is referred to as a control wheel, which is attached to a shaft in a torque-proof and non-displaceable manner.

Alternatively, the at least one lockable gearwheel is designed as a floating wheel of the gearbox, wherein the at least one lockable gearwheel of the gearshift cylinder is connected torque-proof to at least one control wheel, particularly preferred by means of gearshift claws and/or gearshift sleeves, when the gearshift cylinder takes up a rotational position in the locked-rotational range. Thus, the blocked floating wheel leads to the blocking of the wheels.

A shaft can, for instance, be designed as an input shaft, output shaft and/or secondary shaft. The gearbox can have an input shaft for a drive and an output shaft for an output. In addition, a secondary shaft can be provided. The input shaft and output shaft can be arranged coaxially. The output shaft can also be designed as a secondary shaft.

The gearbox can comprise at least one gearshift rail, wherein at least one gearshift fork is positioned displaceably on the at least one gearshift rail, and wherein the pawl is positioned rotatably on at least one gearshift rail of the gearbox. This means that no additional pin is required for bearing the pawl, thus saving components and enabling a particularly compact design.

Preferably, the gearshift cylinder can take up at least two rotational positions in the freewheeling rotational range, wherein one rotational position each in the freewheeling rotational range corresponds to one gear of the gearbox. This means that by means of different rotational positions of the gearshift cylinder, it is possible both to shift between the gears and to lock the gearbox. In particular, it is possible to shift between several forward gears in the freewheeling rotational range.

The gearbox is preferably designed as a claw gear, wherein this type of gearbox is used particularly often on motorcycles. The gearshift cylinder can hereby be rotated, for instance, by the shift pawl, which is actuated with the foot shift lever.

Alternatively or additionally, preferably the gearbox is designed as an automatic gearbox, preferably wherein the gearshift cylinder can be rotated by means of a gearshift motor and/or a gear drive. This means that gears can be shifted fully-automated, or automatically based on an actuation by the motorcyclist.

A motorcycle according to the invention comprises a drive motor and a gearbox. For motorcycles, it is particularly important to realize a compact gearshift lock.

In one embodiment, the motorcycle comprises a "normally open" clutch, preferably a centrifugal clutch, wherein the drive motor can be coupled to the gearbox by means of the "normally open" clutch. In this way, the drive motor is coupled to the gearbox only when reaching a certain rotational speed. This is particularly typical of motorcycles with automatic gearbox. Besides centrifugal clutches, other "normally-open" clutches are also conceivable, for example hydraulic "normally-open" clutches.

The use of "normally closed" couplings is also conceivable.

In a preferred embodiment, the motorcycle has an electronic control unit, wherein control signals can be sent from the electronic control unit to at least one actuator, wherein the gearshift cylinder can be rotated by the at least one actuator, which can be controlled by the control signals, into at least one rotational position in the freewheeling rotational range, and into at least one rotational position in the locked position rotational range. The actuator can for instance be designed as part of a shift motor, in particular an electric one. This can be used to realize an automatic gearbox. It can thereby be provided that the tractive force is automatically reduced when shifting, so that clutching is obsolete when shifting between gears.

Control commands from a motorcyclist can be received by the electronic control unit so that the motorcyclist can shift between different rotational positions of the gearshift cylinder, in particular between at least one rotational position in the freewheeling range, and a rotational position in the locking range, and/or between rotational positions in the freewheeling range. This allows a motorcyclist to operate the automatic gearbox and the gearshift lock. The gearshift lock can therefore be operated via existing components if there is an automatic gearbox on the motorcycle, and no additional components are required.

In one embodiment, at least one actuation indication is provided on the motorcycle, wherein the at least one actuation indication indicates the rotational position of the gearshift cylinder. This informs a motorcyclist about the state of the gearbox, in particular whether the gearbox is locked. The actuation indication can be designed, for example, as a display in the dashboard of a motorcycle. There, an actuation of the gearshift lock can be displayed as a symbol or letter.

Since both, gear shifting and the gearshift lock are realized via a rotational position of the gearshift cylinder, only one sensor is required for both functions. In particular, no separate sensor is required for the gearshift lock. Already existing sensors for determining the rotational position of the gearshift cylinder can be used.

Summing up, the present invention also has the following advantages:

By integrating the parking brake into the shifting mechanism of the gearbox, it can be ensured that it is not possible to forget to disengage the parking brake when starting the vehicle Due to the small number of components, the system can be realized relatively inexpensively.

BRIEF DESCRIPTION OF THE DRAWINGS

Further embodiments and details are visible in the figures. Thereby they show:

FIG. 1 the gearbox with a gearshift lock in perspective view

FIGS. 2a, 2b the gearshift lock with a shift cylinder and pawl wheel in perspective view FIG. 2c the gearshift lock with a gearshift cylinder and pawl wheel in side view FIGS. 2d, 2e the gearshift lock with a gearshift cylinder and pawl wheel in front and rear view FIGS. 3a, 3b the gearshift lock with gearshift cylinder, pawl wheel and gear drive in perspective views FIGS. 3c, 3d the gearshift lock with gearshift cylinder, pawl wheel and gear drive in front and rear view FIG. 4 an alternative embodiment of a gearbox with a gearshift lock in perspective view

DETAILED DESCRIPTION OF THE INVENTION

Figure 3A:
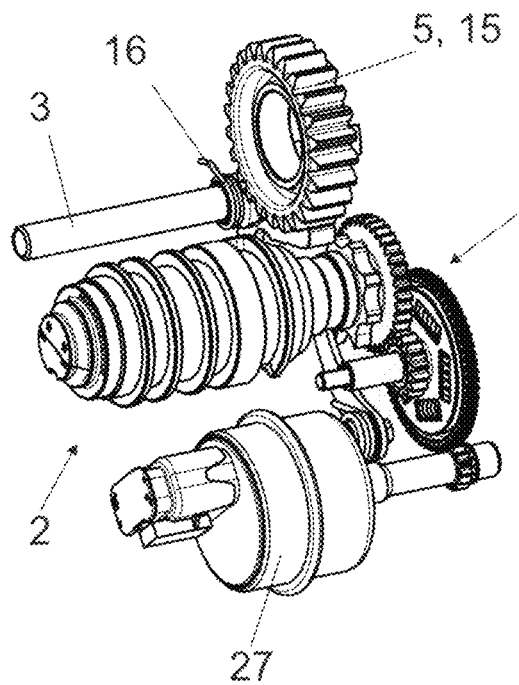
Figure 3B:
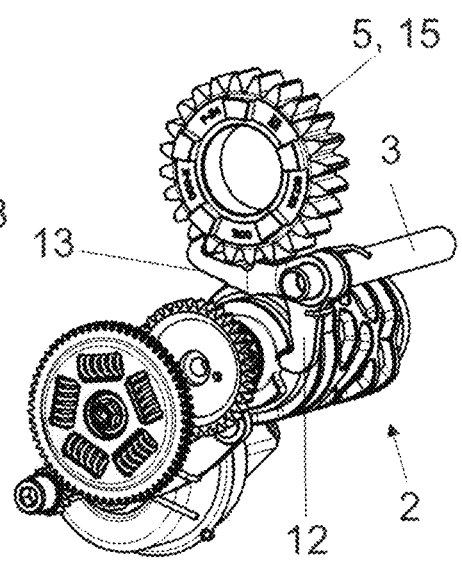
Figure 3C:
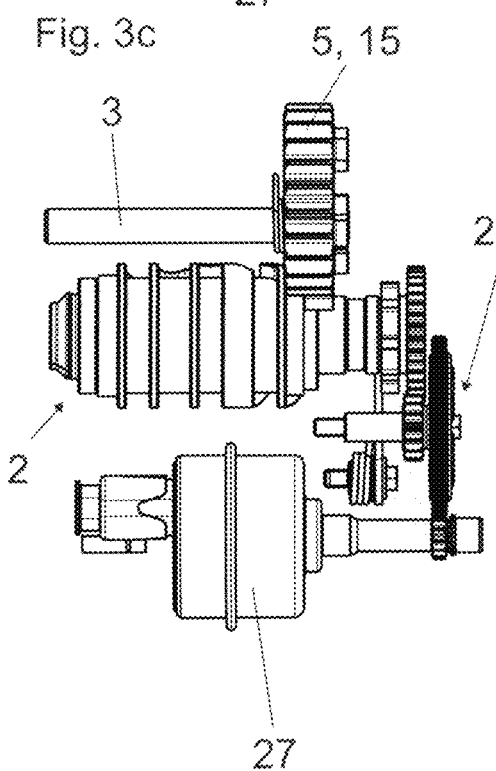
Figure 3D:
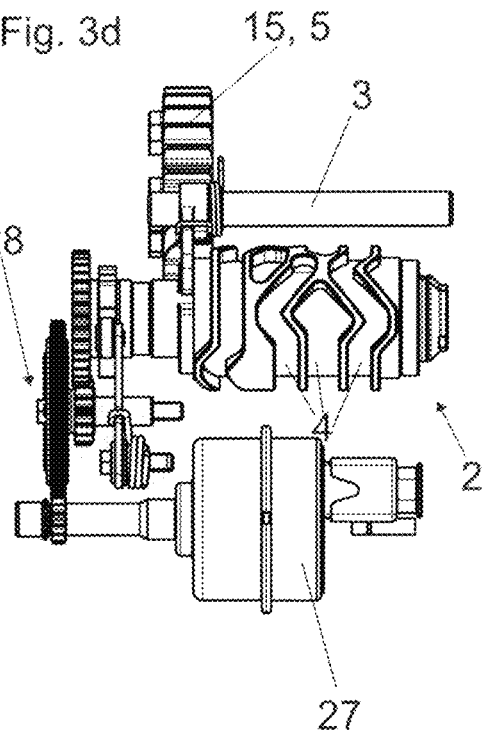

FIG. 1 shows a perspective view of a gearbox 1 with a gearshift lock 30. The gearshift lock 30 is preferably suitable for parking assistance. By locking the gearbox 1, the wheels of the vehicle in which the gearbox 1 is installed are also blocked.

The gearbox 1 comprises a gearshift cylinder 2, two gearshift rails 3 and several gearwheels 5.

In particular, the gearbox 1 is a claw gearbox, which is preferably designed as an automatic gearbox. Thereby, the gearshift cylinder 2 can be rotated by means of a gearshift motor 27 and/or a gear drive 28, as shown in FIGS. 3a to 3d. However, the gearbox 1 can also be designed as a manually shiftable gearbox.

At least one shift fork 10 is positioned displaceably on the two shift rails 3, by means of which certain gearwheels 5 are displaceable. These so-called control wheels 5c are connected torque-proof to the input shaft 6 or the output shaft 7, wherein input shaft 6 and output shaft 7 are arranged coaxially to each other, and together form a main shaft 8. Gearwheels 5 of the type mentioned can also be arranged on a secondary shaft 9.

Moreover, fixed wheels 5b are provided on the shafts, which are arranged in a torque-proof and non-displaceable manner on a shaft, and floating wheels 5a, which are rotatably and non-displaceably arranged on a shaft. By shifting, a control wheel 5c can be coupled to a floating wheel 5a in a torque-proof manner by means of shifting claws, so that the floating wheel 5a is also connected to the shaft in a torque-proof manner. Thus, various combinations of gearwheels 5 on input shaft 6, secondary shaft 9 and output shaft 7 can be selected for power transmission, thus realizing various gears with different gear ratios for a motorcycle.

Such gearboxes 1 are often installed in motorcycles. Preferably, the motorcycle can have a "normally open" clutch, preferably a centrifugal clutch, wherein the drive motor of the motorcycle can be coupled to the gearbox 1 by means of the "normally open" clutch. When at standstill, the clutch is therefore open, with which the wheels of the motorcycle are not coupled to the drive motor, and are therefore not blocked.

The gearshift lock 30 engages in the at least one gearshift cylinder 2 and at least one pawl wheel 15 with a toothing 19. The gearshift lock 30 thereby has a rotatably positioned pawl 13, wherein the pawl 13 engages in the toothing 19 of the at least one pawl wheel 15 in a locked position, and is disengaged from the at least one pawl wheel 15 in a freewheeling position. In particular, the pawl 13 is rotatably positioned on at least one shift rail 3 of the gearbox 1.

The pawl 13 is pretensioned by a spring element 16 in the direction of the locked position. In the embodiment shown in FIG. 1, the spring element 16 is designed as a torsion spring, and is arranged in a bearing portion 32 of the pawl 13.

In FIG. 1, one of the gearwheels 5 is designed as a lockable gearwheel, which is referred to below as pawl wheel 15. If the pawl wheel 15 is designed as a floating wheel 5a, the floating wheel 5a must be coupled to a control wheel 5c in the locked position, otherwise the gearbox 1 would not be lockable by the pawl 13.

Furthermore, it is evident from FIG. 1 that an engagement element 12 is connected to the pawl 13, wherein the engagement element 12 holds the pawl 13 in the freewheeling position by directly interacting with the gearshift cylinder 2 against the effect of the spring element 16 when the gearshift cylinder 2 takes up a rotational position in a freewheeling rotational range, and wherein the pawl 13 can be released from the gearshift cylinder 2 into a locked position by means of the engagement element 12 when the gearshift cylinder 2 takes up a rotational position in a locked rotational range. The engagement element 12 is connected to the pawl 13, in particular, torque-proof. FIG. 1 thereby shows the locked position in which the pawl 2 is released by means of the engagement element 12.

In addition, the gearshift cylinder 2 has at least two rotational positions in the freewheeling rotational range, wherein one rotational position each in the freewheeling rotational range corresponds to a gear of the gearbox 1. In particular, several forward gears are provided in the freewheeling rotational range.

FIGS. 2a to 2e show the gearshift lock 30 from FIG. 1 in various views, wherein the gearbox 1 is not completely shown here. The gearshift lock 30 is also shown here in the locked position. The locking mechanism can be easily understood in particular by means of the side view in FIG. 2c.

The pawl 13 has a bearing portion 32, wherein the pawl 13 is rotatably positioned in the bearing portion 32. In addition, the pawl 13 has a locking range, wherein the pawl 13 engages in the toothing 19 of the pawl wheel 15 in the locking range.

In the locking range, the pawl 13 has, in particular, a locking contour 14. The locking contour 14 engages in at least two different interdental spaces 24, wherein the locking contour 14 is adapted to the toothing 19. This allows it to be realized that the pawl 13 is mechanically repelled by the at least one pawl wheel 15, so that the gearbox 1 is not blocked when the pawl 13 engages in a rotating pawl wheel 15, and/or can be disengaged from the locked position even when the gearbox 1 is under load.

In FIGS. 1 to 3d, the engagement element 12 is designed as a support arm 23. The support arm 23 has a contact surface 33 for resting on the gearshift cylinder 2. Furthermore, the support arm is connected to the pawl in a bearing portion 32 of the pawl 13 in a torque-proof manner. Together with the pawl 13, the support arm 23 forms a two-sided lever, in particular an angle lever, wherein the angle of the angle lever is in the range from 80 to 100 degrees (see FIG. 2c).

A contact surface 33 for placing the support arm 23 on the gearshift cylinder 2 and the locking contour 14 for engaging the pawl 13 in the toothing 19 of the at least one pawl wheel 15 are arranged on the same side, in particular both on the right, of the support arm 23 and the pawl 13, respectively, as viewed from a shared bearing portion 32 of the support arm 23 and the pawl 13.

This configuration of the contact surface 33 and the locking contour 14 is appropriate as the pawl 13 and/or at least one locking range of the pawl 13 is arranged in a space between the gearshift cylinder 2 and the at least one pawl wheel 15 (see in particular FIG. 2c).

The gearshift cylinder 2 has an actuating contour 11, wherein the engagement element 12, here in particular the support arm 23, can be supported on the actuating contour 11 in the freewheeling position. In particular, the actuating contour 11 runs along a circular path 25 in the freewheeling rotational range of the gearshift cylinder 2, wherein the engagement element 12, here in particular the support arm 23, rests on the actuating contour 11 with the contact surface 33. It should be noted here that the freewheeling position is not shown in any of the figures.

In the locked rotational range of the gearshift cylinder 2, the actuating contour 11 has a radially inwardly-pointing recessed recess 26 and/or a radially inwardly-pointing recessed curve so that the engagement element 12, in particular the support arm 23, is released in radial direction at a rotational position of the gearshift cylinder 2 in the locked rotational range. As a result, the support arm 23 can no longer rest on the gearshift cylinder 2, causing the pawl 13 to be pressed into the pawl wheel 15 by the spring element 16.

In FIG. 2c, the impression can arise that the support arm 23 also rests on the gearshift cylinder 2, in particular the actuating contour 11, in the locked position. This is preferably not the case, since the pawl 13 is held in the locked position by the pawl wheel 15.

Since the support arm 23 and the pawl 13 are released in the locked rotational range by means of a recess 26 in the actuating contour 11, the pawl 13 is not pressed into the toothing 19 of the pawl wheel 15 by an actuating contour, for instance with a locking cam.

By contrast, the spring element 16 presses the pawl 13 into the toothing 19, with which no problem arises if the pawl 13 does not immediately hit an interdental space 24 with its locking contour 14.

In addition, the actuating contour 11 is arranged radially within an outer radius of the gearshift cylinder 2 on a front face 20 of the gearshift cylinder 2. It is provided that the actuating contour 11 is arranged directly on the gearshift cylinder 2, and is not attached to the gearshift cylinder 2 as a separate component.

FIGS. 3a to 3d show a gearshift lock 30 with a gearshift cylinder 2 and a pawl wheel 15, wherein a gear drive 28 is shown here, via which the gearshift cylinder 2 can be driven by means of a geared motor 27. This is a possible embodiment particularly in automatic gearboxes 1. The geared motor 27 is typically designed as an electric motor.

Not shown is the integration of the automatic gearbox 1 into a motorcycle. It can thereby be provided, for instance, that control commands of a motorcyclist can be received by an electronic control unit so that the motorcyclist can shift between different rotational positions of the gearshift cylinder, in particular between at least one rotational position in the freewheeling range, and a rotational position in the locking range, and/or between rotational positions in the freewheeling range. At least one actuator of a geared motor 27 can then be controlled by the control unit.

Also, at least one actuation indication can be provided on the motorcycle, wherein the at least one actuation indication indicates the rotational position 2 of the gearshift cylinder. Since the rotational position of the gearshift cylinder 2 is known, for instance, via the position of an actuator of the geared motor 27, no additional sensor needs to be installed in the gearshift lock 30 for the actuation indication.

Figure 4:
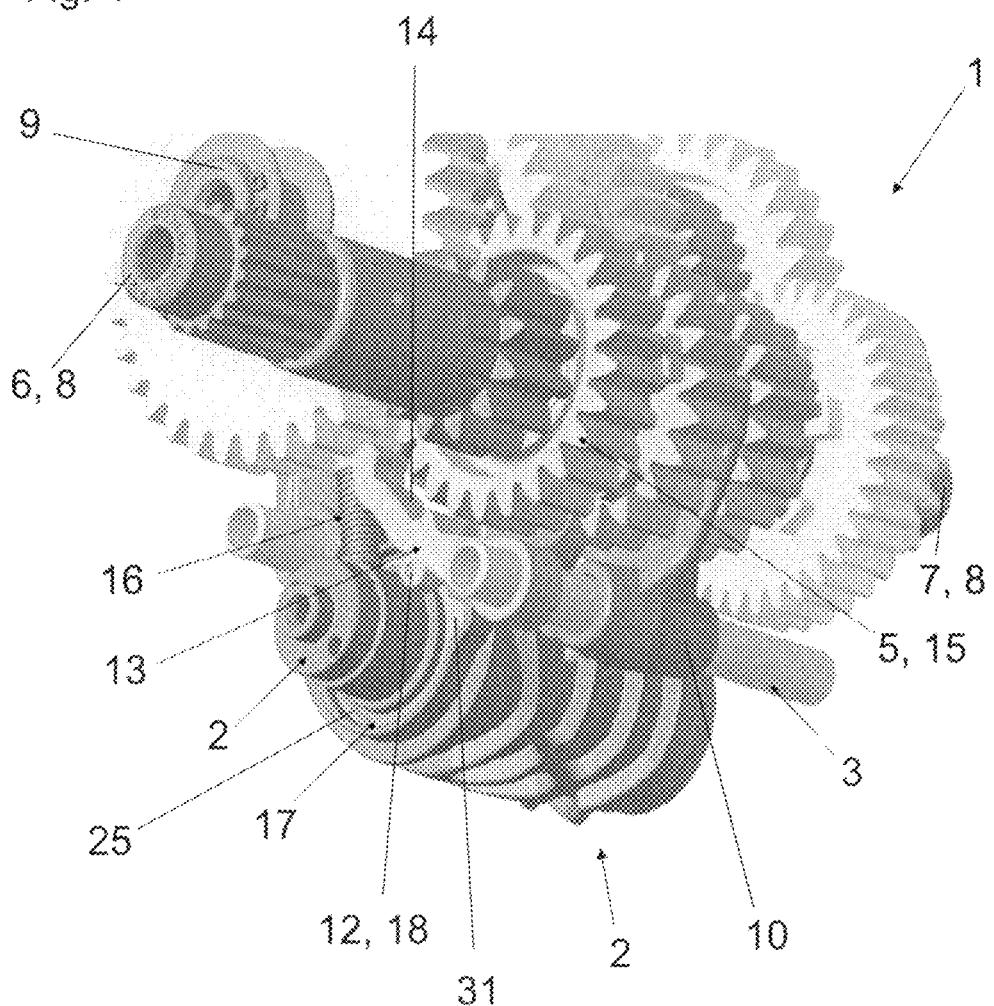

FIG. 4 shows an alternative embodiment of a gearbox 1 with a gearshift lock 30 in perspective view, wherein a freewheeling position of the gearshift lock 30 is shown.

In contrast to the embodiment of FIGS. 1 to 3d, the spring element 16 here engages in the pawl 13 in a second end area 22 of the pawl 13, wherein the second end area 22 lies opposite the bearing portion 32 of the pawl 13.

In such a case, as visible in FIG. 4, it can be provided that the spring element 16 is positioned rotatably on the gearshift cylinder 13. This means that the gearshift cylinder 2 already existing in the gearbox 1 is additionally used as a bearing pin for the spring element 16. The spring element 16 can comprise a compression spring and/or a telescopic guide.

An additional difference to the embodiment from FIGS. 1 to 3*d* is the form and function of the engagement element 12, which in FIG. 4 is designed as a driver pin 18. The driver pin 18 directly interacts with the gearshift cylinder 2 to hold the pawl 13 in a freewheeling position.

The driver pin 18 can be attached to the pawl 13 between the bearing portion 32 and at least a part of the locking range, wherein the bearing portion 32 is arranged at a first end area 21 of the pawl 13, and wherein the locking range is arranged at least in part at a second end area 22. Thus, in this embodiment, the force acts directly on the pawl 13. The pawl 13 and the engagement element 12 together do not form a two-sided lever here.

The driver pin 18 and thus the pawl 13 can be held or released by an actuating baffle guide 17, wherein the actuating baffle guide 17 is arranged on the gearshift cylinder 2. The shape of the actuating baffle guide 17 defines, at least in sections, the rotational position of the pawl 13 depending on the rotational position of the gearshift cylinder 2.

The actuating baffle guide 17 can run along a circular path 25 in the freewheeling rotational range of the gearshift cylinder 2 so that the driver pin 18 can preferably be held in a position in radial direction of the gearshift cylinder 2 in the freewheeling rotational range. This means that the position of the pawl 13 in the freewheeling rotational range, which does not engage in the pawl wheel 15, does not change. Alternatively, an elliptical or another non-circular shape of the actuating baffle guide 17 can be provided.

The actuating baffle guide 17 can have a radially outward-pointing bulge 31 and/or a radially outward-pointing curve in the locked rotational range of the gearshift cylinder 2, so that the driver pin 18 is preferably released in radial direction at a rotational position of the gearshift cylinder 2 in the locked rotational range. Then, the driver pin 18 is arranged further outwards than in a rotational position of the gearshift cylinder 2 at a freewheeling rotational range. If the driver pin 18 is attached to the pawl 13 between the bearing portion 32 and at least a part of the locking range, this results in a movement towards the pawl wheel 15 so that the pawl 13 and the pawl wheel 15 both engage in.

When the pawl 13 moves from the freewheeling position to the locked position, a contact surface 33 of the engagement element 12 moves radially outwards in the embodiment of FIG. 4, while in the embodiment of FIGS. 1 to 3*d*, the contact surface 33 moves inwards due to the lever transmission.

It can be provided that the driver pin 18 can be held in a second radial position at a rotational position of the gearshift cylinder 2 in the locked rotational range in radial direction, wherein the second radial position is arranged further outwards than the radial position of the driver pin 18 in the freewheeling rotational range. However, it is preferably also provided here that the pawl 13 is held in locked position by the pawl wheel 15.

LIST OF REFERENCE SIGNS

1 gearbox
2 gearshift cylinder
3 gearshift rail
4 gearshift baffle guide
5 gearwheel
5*a* floating wheel
5*b* fixed wheel
5*c* control wheel
6 input shaft
7 output shaft
8 main shaft
9 secondary shaft
10 gearshift fork
11 actuating contour
12 engagement element
13 pawl
14 pawl contour
15 pawl wheel
16 spring element
17 actuating baffle guide
18 driver pin
19 toothing of the pawl wheel
20 front side of the gearshift cylinder
21 first end area of the pawl
22 second end area of the pawl
23 support arm
24 interdental space
25 circular path of the actuating contour/baffle guide
26 actuating contour recess
27 geared motor
28 gear drive
29 locking range
30 gearshift lock
31 bulge of the actuating baffle guide
32 bearing portion
33 contact surface

The invention claimed is:

1. A gearbox comprising:
at least one gearshift cylinder;
at least one pawl wheel with a toothing;
a gearshift lock;
at least one gearshift rail; and
at least one gearshift fork,
wherein:
the gearshift lock includes a pawl, an engagement element and a spring element;
the pawl is configured to engage in the toothing of the at least one pawl wheel in a locked position, and disengage from the at least one pawl wheel in a freewheeling position;
the pawl is pretensioned by the spring element in a direction of the locked position;
the engagement element is connected to the pawl;
the engagement element is configured to hold the pawl in the freewheeling position by directly interacting with the at least one gearshift cylinder against an effect of the spring element when the at least one gearshift cylinder takes up a first rotational position in a freewheeling rotational range;
the pawl can be released into the locked position by the engagement element when the at least one gearshift cylinder takes up a second rotational position in a locked rotational range;
the at least one gearshift fork is displaceably positioned on the at least one gearshift rail; and
the pawl is rotatably positioned on the at least one gearshift rail.

2. The gearbox according to claim 1, wherein:
the pawl has a bearing portion;
the pawl is rotatably positioned via the bearing portion;
the pawl has a locking range; and
the pawl is configured to engage in the toothing of the at least one pawl wheel in the locking range.

3. The gearbox according to claim 1, wherein the spring element is a torsion spring or is arranged in a bearing portion of the pawl.

4. The gearbox according to claim 1, wherein the pawl has a locking contour in a locking range, and the locking contour is configured to engage in the toothing of the at least one pawl wheel.

5. The gearbox according to claim 4, wherein the locking contour is:
- configured to engage in at least one interdental space; or
- adapted to the toothing of the at least one pawl wheel such that the pawl: (i) is configured to be mechanically repelled by the at least one pawl wheel such that the gearbox is not blocked when the pawl engages in the at least one pawl wheel; or (ii) can be released from the locked position even when the gearbox is under load.

6. The gearbox according to claim 1, wherein the engagement element is a support arm.

7. The gearbox according to claim 6, wherein the support arm includes a contact surface for placement on the at least one gearshift cylinder.

8. The gearbox according to claim 6, wherein:
- the engagement element is a driver pin; or
- the support arm;
- is connected to a bearing portion of the pawl;
- together with the pawl defines a two-sided lever; or
- includes a contact surface for placement on the at least one gearshift cylinder and a locking contour for engagement of the pawl in the toothing of the at least one pawl wheel, the contact surface and the locking contour being arranged on a same side of the support arm and the pawl, respectively, as viewed from the bearing portion of the pawl.

9. The gearbox according to claim 1, wherein the at least one gearshift cylinder has an actuating contour, and the engagement element can be supported on the actuating contour in the freewheeling position.

10. The gearbox according to claim 9, wherein the actuating contour:
- runs along a circular path in the freewheeling rotational range such that the engagement element is configured to rest on the actuating contour with a contact surface;
- has a radially inward-pointing recessed recess or a radially inward-pointing recessed curve in the locked rotational range;
- has a radially outward-pointing bulge or a radially outward-pointing curve in the locked rotational range;
- is arranged radially within an outer radius of the at least one gearshift cylinder; or
- is arranged on a front face of the at least one gearshift cylinder.

11. The gearbox according to claim 10, wherein the engagement element is:
- configured to be released in a radial direction at the second rotational position of the at least one gearshift cylinder; or
- arranged radially further inward than at the first rotational position of the at least one gearshift cylinder.

12. The gearbox according to claim 1, wherein the pawl or at least one locking range of the pawl is arranged in a space between the at least one gearshift cylinder and the at least one pawl wheel.

13. The gearbox according to claim 1, further comprising a housing, wherein the gearshift lock is completely arranged in the housing.

14. The gearbox according to claim 1, wherein the at least one pawl wheel is connected to an output shaft of the gearbox so as to be torque-proof.

15. The gearbox according to claim 1, wherein:
- the gearbox includes a number of gearwheels; and
- the at least one pawl wheel is at least one lockable gearwheel of the number of gearwheels.

16. The gearbox according to claim 15, wherein the at least one lockable gearwheel:
- is connected to a first control wheel so as to be torque-proof when the at least one gearshift cylinder takes up the second rotational position; and
- is a fixed wheel of the gearbox, a second control wheel of the gearbox or a floating wheel of the gearbox.

17. The gearbox according to claim 16, wherein the at least one lockable gearwheel is connected to the first control wheel by shiftable claws or shiftable collars.

18. The gearbox according to claim 1, wherein:
- the first rotational position is one of at least two rotational positions in the freewheeling rotational range; and
- the at least two rotational positions in the freewheeling rotational range correspond to gears of the gearbox, respectively.

19. The gearbox according to claim 1, wherein the gearbox is a claw transmission or an automatic gearbox.

20. The gearbox according to claim 19, wherein the at least one gear cylinder is rotatable by a geared motor or a gear drive.

* * * * *